United States Patent
Valembois

(10) Patent No.: US 9,259,878 B2
(45) Date of Patent: Feb. 16, 2016

(54) PART MADE OF A COMPOSITE, ITS MANUFACTURING PROCESS AND CONNECTING ROD OBTAINED BY THIS PROCESS

(75) Inventor: Guy Valembois, Lauzerville (FR)

(73) Assignee: SKF Aerospace France, Saint Vallier (FR)

( * ) Notice: Subject to any disclaimer, the term of this patent is extended or adjusted under 35 U.S.C. 154(b) by 414 days.

(21) Appl. No.: 13/811,264

(22) PCT Filed: Jul. 19, 2011

(86) PCT No.: PCT/FR2011/051737
§ 371 (c)(1),
(2), (4) Date: Jan. 19, 2013

(87) PCT Pub. No.: WO2012/017164
PCT Pub. Date: Feb. 9, 2012

(65) Prior Publication Data
US 2013/0129956 A1 May 23, 2013

(30) Foreign Application Priority Data

Jul. 20, 2010 (FR) ...................... 10 55893

(51) Int. Cl.
*B29C 53/12* (2006.01)
*B29C 53/56* (2006.01)
*B29C 70/20* (2006.01)
*B29C 70/30* (2006.01)
*F16C 7/02* (2006.01)
*B29L 31/06* (2006.01)

(52) U.S. Cl.
CPC ............... *B29C 53/12* (2013.01); *B29C 53/564* (2013.01); *B29C 70/207* (2013.01); *B29C 70/30* (2013.01); *F16C 7/026* (2013.01); *B29L 2031/06* (2013.01); *Y10T 428/1397* (2015.01)

(58) Field of Classification Search
CPC .... B29C 53/12; B29C 53/564; B29C 70/207; B29C 70/30; F16C 7/026; Y10T 428/1397; B29L 2031/06
See application file for complete search history.

(56) References Cited

U.S. PATENT DOCUMENTS

| 4,757,681 A | 7/1988 | Matsuno |
| 4,992,313 A | 2/1991 | Shobert et al. |
| 5,397,272 A | 3/1995 | Smiley et al. |
| 6,202,505 B1 | 3/2001 | Auberon et al. |
| 2005/0056503 A1 | 3/2005 | Jones |

FOREIGN PATENT DOCUMENTS

| DE | 41 39 779 C1 | 5/1993 |
| EP | 0 668 446 A1 | 8/1995 |
| JP | 6 094024 A | 4/1994 |

*Primary Examiner* — Michael C Miggins
(74) *Attorney, Agent, or Firm* — Andrew W. Chu; Craft Chu PLLC

(57) ABSTRACT

A part made of a composite is intended to be subjected, through at least a point of attachment and in cooperation with connectors, to tensile and/or compressive forces. The part includes a monolithic part having a winding of fibers oriented and embedded in a matrix, and a tubular body, wherein an attachment point, based at one end of said tubular body takes the form of a strap forming a loop turning about an axis perpendicular to the axis of the tubular body, and wherein an internal wall and/or the external wall of the loop is designed to cooperate with a portion of the connector in tension and/or in compression along one or more directions.

11 Claims, 3 Drawing Sheets

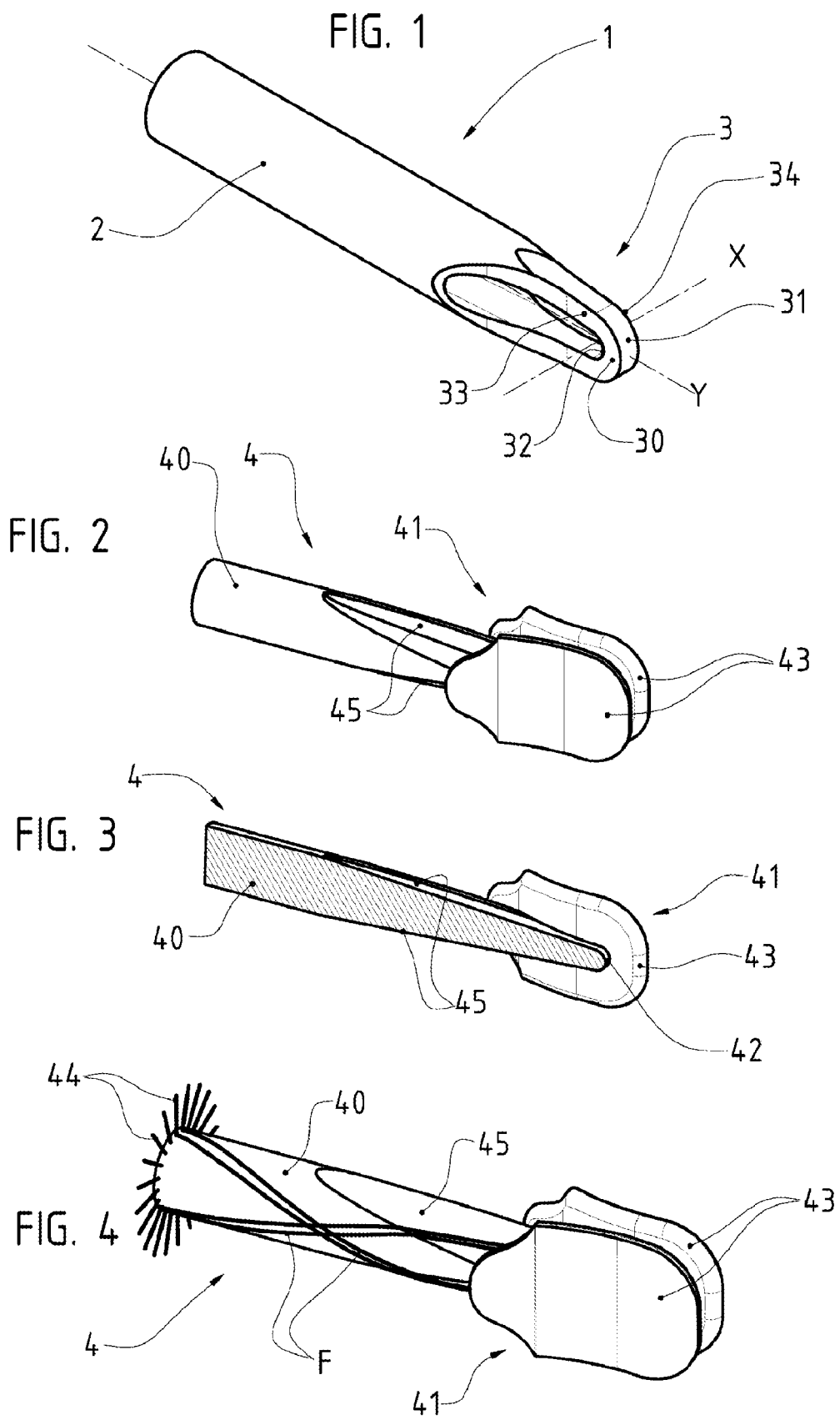

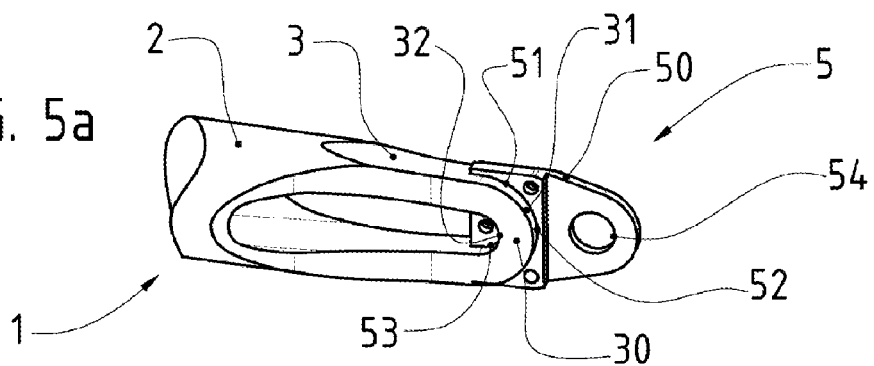
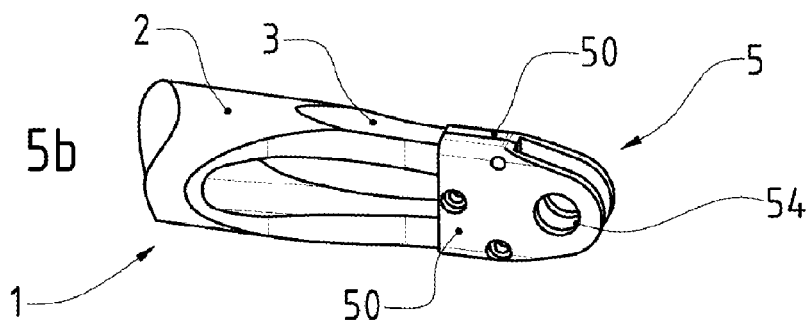
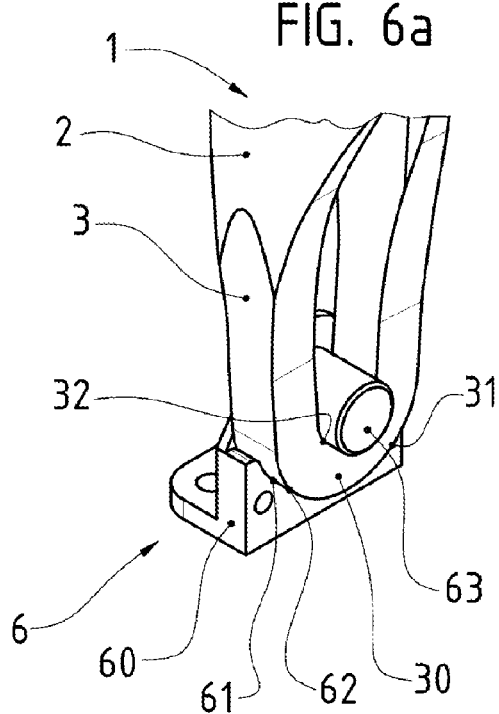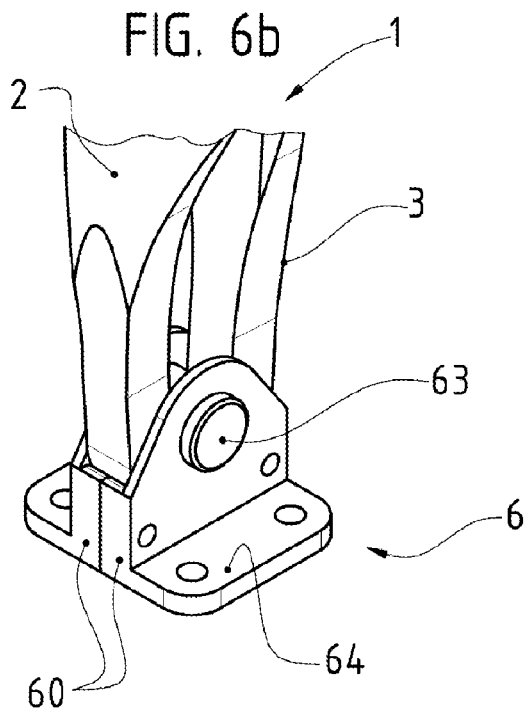

PART MADE OF A COMPOSITE, ITS MANUFACTURING PROCESS AND CONNECTING ROD OBTAINED BY THIS PROCESS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention is related to the field of the parts made of composite materials, and more particularly of the parts aimed at being assembled with other ones and likely to be subjected to tensile and/or compression forces.

Thus, the object of the present invention is such a part made of composite material aimed at being subjected, through at least one point of attachment, to tensile and/or compression forces, as well as the method for obtaining this part.

The present invention finds a particular application in the field of the manufacture of connecting rods, and thus another object is also a connecting rod made according to the inventive method.

2. Description of Related Art Including Information Disclosed Under 37 CFR 1.97 and 37 CFR 1.98.

It is known that the weak point of the composite materials is the thermoplastic or thermosetting matrix in which reinforcing fibers are embedded, and which is generally made of a resin, because it has a specific strength that is much lower than that of the fibers. The way of ruining of a part made of a composite material is generally a fracture of the resin binding the fibers.

A good design of a composite part takes this phenomenon into consideration and favors a transmission of the forces by putting the fibers under pure tension or compression, which results into not stressing the resin. Thus, the composite material is formed of layers of fibers oriented in the direction of said forces or in directions close to the latter.

Though this can easily be done at the level of the essential portion of the part when the shapes are simple and the direction of the forces is controlled, it is difficult at the level of the areas of joining with one or several other parts, namely the areas in which the tensile or compression force is exerted.

In general, such a joining area includes an insert provided with a connecting means permitting to make the connection and the transmission of the forces into the part, but the putting in place of such inserts is particularly difficult, namely when the forces are aimed at changing in direction during the use of said composite part.

The main drawback is thus localized at the level of the joining of the body of the composite part with the insert, and is related to the transmission of the force from the one to the other.

Thus, from WO 2008/066606 is known a connecting rod comprising a tubular body made of composite material, each end of which a metallic insert is made integral with through mutually connected dual-shearing joints.

From U.S. Pat. No. 4,992,313 is also known a connecting rod formed of the winding of fibers about a mandrel comprising the inserts aimed at forming the eyes.

From FR 2 152 289 is also known a force-transmitting organ, such as a connecting rod, made of a fiber-reinforced synthetic material. This organ comprises a tubular central body containing fibers oriented according to the direction in which the forces are exerted, and the ends of which are narrowed in the form of a truncated cone in order to permit to make integral with each of them a connecting means, which is formed of two portions, an internal one and an external one, so as to be capable of enclosing the narrowed portion of the end of the tubular central body.

However, this force-transmitting organ only partially copes with the problems of joining the body of the composite part with the insert, and problems of long-term resistance and strength remain.

Also known are composite parts, in which the insert including the connecting means is embedded in the composite material the body is made of. Such composite parts only partially permit to cope with the problems of joining, because problems of discontinuity of the tensile and/or compression strength remain.

From US2005/056503 is also known a connecting rod formed of oriented reinforcing fibers embedded in a matrix, wound onto a mandrel, as well as an insert made by winding fibers, and aimed at forming an eye of said connecting rod, by being embedded in a hole provided for in the end of the latter. Such a connecting rod can in no way be subjected to tensile and/or compression forces, the more when the direction of the forces is intended to vary.

SUMMARY OF THE INVENTION

The object of the present invention is to provide a part made of composite material aimed at being subjected, through at least one point of attachment, to tensile and/or compression forces, even when the direction of said forces is intended to vary, which permits to cope with the various above-mentioned drawbacks.

The part made of composite material aimed at being subjected, through at least one point of attachment and in cooperation with a connecting means, to tensile and/or compression forces, is essentially characterized in that it consists of a monolithic part formed of a winding of oriented reinforcing fibers embedded in a matrix, and which includes a body having a tubular shape, while said point of attachment, arranged at one end of said body having a tubular shape, is in the form of a strap forming a loop rotating about an axis perpendicular to the axis of said body having a tubular shape, the inner wall and/or the outer wall of said loop being conformed so as to cooperate with a portion of said connecting means in tension and/or compression according to one or several directions.

According to an additional feature of the part made of composite material according to the invention, the strap has two flat outer faces perpendicular to the axis of the loop.

According to another additional feature of the part made of composite material according to the invention, the outer wall of the loop is convex and has the shape of a portion of a cylinder, so as to form a resting face capable of cooperating with a portion of the connecting means having a complementary shape, for operating in compression according to one or several directions.

According to another additional feature of the part made of composite material according to the invention, the outer wall of the loop is convex and has the shape of a portion of a sphere, so as to form a resting face capable of cooperating with part of the connecting means having a complementary shape, for operating in compression according to one or several directions.

According to another additional feature of the part made of composite material according to the invention, the inner wall of the loop is concave and has the shape of a portion of a cylinder, so as to form a resting face capable of cooperating with a portion of the connecting means having a complementary shape, for operating in tension according to one or several directions.

According to another additional feature of the part made of composite material according to the invention, the inner wall of the loop is concave and has the shape of a portion of a sphere, so as to form a resting face capable of cooperating with a portion of the connecting means having a complementary shape, for operating in tension according to one or several directions.

The inner and outer walls of the loop have a cylindrical and/or spherical profile, and are concentric. Preferably, when one of them has a cylindrical profile, the other one also has a cylindrical profile, but it is possible that one of them has a spherical profile, while the other one has a cylindrical profile.

Another object of the present invention is a method for manufacturing a part made of composite material intended to be subjected, through at least one point of attachment, to tensile and/or compression forces, said composite material resulting either from the winding of reinforcing fibers pre-impregnated with a thermosetting or thermoplastic resin or from the winding of reinforcing fibers pre-impregnated, after the winding operation, with a thermosetting or thermoplastic resin, which method is characterized in that it consists:

in preparing a mandrel comprising an elongated body, axially extended, at least at one of its ends, by a distal portion the end of which has a curved convex median area edged by two flanges, in winding the reinforcing fibers onto said mandrel, while passing alternately on the one hand helically on said body according to a determined pitch and on the other hand on said median area between said flanges, in subjecting the whole to polymerization conditions adapted to the thermosetting or thermoplastic resin being used.

According to an additional feature of the method according to the invention, the median area of the mandrel has a profile having the shape of a portion of a sphere, so as to provide the inner wall of the portion molded onto this area the shape of a portion of a sphere, and in that, after polymerization, the outer wall of said molded portion is machined in order to provide same with the shape of a portion of a sphere, which is concentric to the portion of a sphere of said inner wall.

The method according to the invention as described above permits to manufacture connecting rods made of composite material.

The advantages and features of the composite part according to the invention, as well as of the method for its manufacturing, will become clear from the following description, which refers to the attached drawing, which represents several non-restrictive embodiments of same.

BRIEF DESCRIPTION OF THE DRAWINGS

FIG. 1 represents a schematic perspective view of a composite part, or portion of a composite part, according to the invention.

FIG. 2 represents a schematic perspective view of a mandrel for implementing the method for making the same composite art.

FIG. 3 represents a schematic perspective and cross-sectional view of the same mandrel.

FIG. 4 represents a schematic perspective view of the same mandrel during a phase of the method.

FIGS. 5a and 5b represent partial schematic perspective views of the composite part, or portion of a composite part, of FIG. 1 during its use.

FIGS. 6a and 6b represent partial schematic perspective views of the composite part, or portion of a composite part, of FIG. 2 during another use.

DETAILED DESCRIPTION OF THE DRAWINGS

Figure 7:
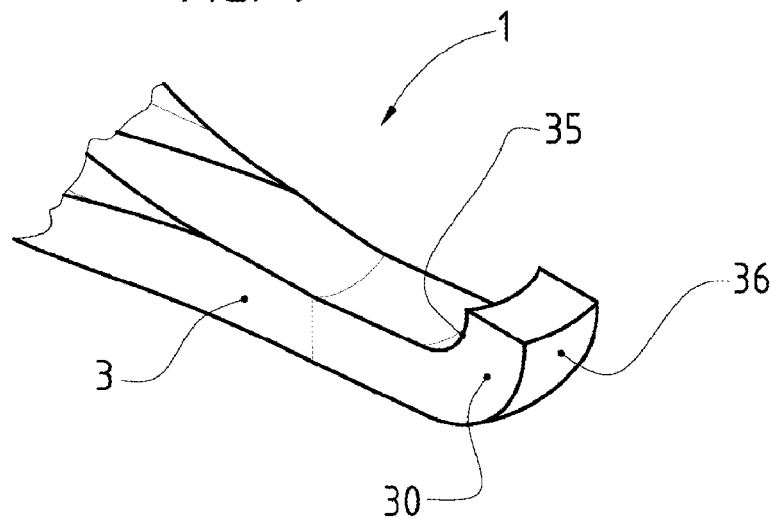
FIG. 7 represents a partial schematic perspective and cross-sectional view of a portion of a variant of the composite part according to the invention.

When referring to FIG. 1, one can see a composite part 1, or a portion of a composite part, according to the invention, which may consist of an end of a connecting rod, knowing that the other end, not shown, may be of an identical design, while having eventually different shapes, dimensions and orientation.

This composite part 1 is monolithic, it comprises a tubular body 2 with a longitudinal axis Y, extended at the end with a strap 3 forming a loop 30 rotating at 180° about an axis X perpendicular to the axis Y.

The tubular body 2 has, non-restrictively, a cylindrical shape, while the loop 30 has a convex outer wall 31 having the shape of a portion of a cylinder, a concave inner wall 32 having the shape of a portion of a cylinder and coaxial to the outer wall 31, as well as two flat sidewalls 33 and 34 perpendicular to the axis X.

The method for manufacturing the composite part 1 is shown in FIGS. 2, 3 and 4. In FIGS. 2 and 3 can also be seen a mandrel 4 used in this method.

The mandrel 4 comprises an elongated body 40, in this case of a cylindrical shape, extended by a distal portion 41 the end of which comprises a median area 42, partly visible in FIG. 3, having a convex shape in the form of a portion of a cylinder, laterally edged by two flanges 43.

In FIG. 4 can be seen that the method for manufacturing a composite part 1 according to the invention includes a step that consists in winding reinforcing fibers F onto the mandrel 4, this winding being made passing alternately on the body 40, then on the median area 42 between the two flanges 43. The winding onto the body 40 occurs helically, according to a predetermined pitch.

It should be noted that in FIG. 4 the fibers F are maintained and angularly distributed by means of radial guides 44.

In the case of the manufacture of a composite part, such as a connecting rod, comprising a strap 3 at each end of the tubular body 2, the mandrel 4 includes two distal ends 41 each provided with flanges 43, and is without radial guides 44, and the winding of the fibers F occurs passing alternately from one distal end 41 to the other one, winding them helically onto the body 40 according to the desired pitch.

It should also be noted that during the winding the concentration of the reinforcing fibers F is higher at the level of the median area 42 than at the level of the body 40, i.e. the thickness of the strap 3 is larger than that of the wall of the tubular body 2, therefore, in order for the composite part 1 to have, at the level of the strap, outer dimensions similar to those of the tubular body 2, the distal portion 41 of the mandrel 4 is narrowing, namely through two beveled faces 45 tangential to the median area 42, as can be seen in particular in FIG. 3.

The method then consists, after winding of the fibers, in impregnating the whole with a thermosetting or thermoplastic resin, then in subjecting the whole to adapted polymerization conditions.

It should be noted that it is also possible to use fibers F pre-impregnated with resin. Of course, the mandrel 4 is designed so as to be capable of being removed after polymerization, it can thus be, non-restrictively, dismountable or made of a fusible material.

Thus, the composite part 1, as well as a connecting rod made according to the same method, is of one single piece, and the reinforcing fibers it includes are oriented optimally to withstand the tensile or compression forces.

The tubular body 2 has a round cross-section, but it may of course have a cross-section with a different shape: oval, hexagonal, even square. The fibers F contained in the strap 3 essentially extend, at least in its rectilinear portions, in the direction of the main axis of the composite part 1, or in a direction close to this axis.

When referring now to FIGS. 5a and 5b, we can see a way of using a composite part 1. In this way of using, the composite part is used in cooperation with a connector 5, for example made of metal, intended to be fixed to the strap 3.

This connector 5 is formed of the bringing close to each other of two half-shells 50 about the loop 30 of the strap 3. Each of the half-shells 50 includes a recess 51 that has the hollow shape of the half, in the longitudinal direction, of the end of the strap 3, i.e. a concave outer wall 52 and a convex inner wall 53, symmetrical to the walls 31 and 32, respectively, of the loop 30. The walls 52 and 53 are semi-circular, eventually extended by a tangent portion.

After assembling the two half-shells 50, the connector 5 is perfectly adapted to the strap 3, and immobilized on the latter. The connector 5 is provided with an eyelet 54 permitting the fixing to an organ, not shown.

An axial tensile force exerted between the composite part 1 and the connector 5 through the eyelet 54 results into a pure axial tension of the fibers F in the rectilinear portions, and a pure compression of the matrix in the curved areas into contact, namely between the walls 32 and 53, so that there exists no risk of deterioration of the matrix, and of delamination of the fibers.

This also applies in the case of an axial compression in the rectilinear portions of the strap 3, the compression occurs at the level of the fibers F, while in the curved areas into contact, i.e. between the walls 31 and 52, the compression occurs at the level of the matrix.

When referring now to FIGS. 6a and 6b, we can see another way of using a composite part 1, where the latter is used in cooperation with a connector 6, for example made of metal, intended to be fixed to the strap 3 and consisting of a kind of fixing plate.

The connector 6 is formed of the bringing close to each other of two half-shells 60 about the loop 30 of the strap 3. Each of the half-shells 60 includes a recess 61 that has approximately the hollow shape of the half, in the longitudinal direction, of the end of the strap 3. This recess 61 is delimited on one side by a concave outer wall 62, and on the other side by a cylindrical pivot 63, whether fixed or movable in axial pivoting.

The cylindrical pivot 63 has a radius equal to that of the concave inner wall 32 of the loop 30, while the concave outer wall 62 is circular and has a radius equal to that of the convex outer wall 31, but extending over an angular sector smaller than 180°.

One understands that after assembling of the two half-shells 60, the strap 3 is maintained closely within the connector 6, however with a degree of freedom in pivoting about the axis of the cylindrical pivot 63, and according to the value of the angular sector covered by the circular segment of the concave outer wall 62.

It should furthermore be noted that the connector 6 includes, on the side opposite the one including the pivot 63, a platelet 64 intended to permit to make it integral with a support, so that the connector 6 can be perfectly adapted to a tensile and/or compression force being exerted onto the composite part 1.

When referring now to FIG. 7, we can see a variant of the composite part 1, the loop 30 of which, partially shown, includes a concave inner wall 35 having a profile in the shape of a portion of a sphere, and a convex outer wall 36, also having a profile in the shape of a portion of a sphere, the walls 35 and 36 being concentric.

From the manufacturing point of view, it results, as regards the concave inner wall 35, from a particular shape of the mandrel 4 and in particular of the median area 42, while, as regards the convex outer wall 36, it is made through machining.

Figure 8:
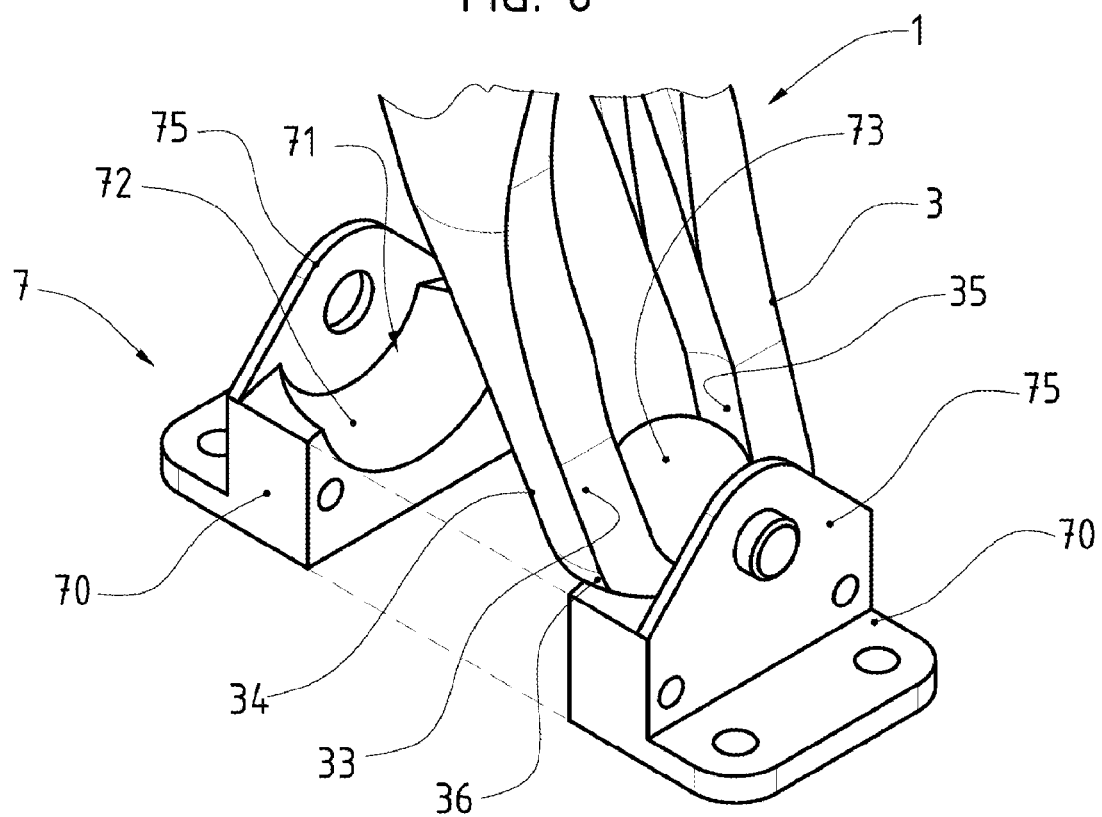
FIG. 8 represents a partial schematic perspective and exploded view of the same variant during its use.

When referring to FIG. 8, we can see a composite part 1 having such a variant, associated with a connector 7 formed of the bringing close to each other of two half-shells 70 about the loop 30 of the strap 3, and consisting of a kind of fixing plate.

Each half-shell 70 includes a recess 71 that has approximately the hollow shape of the half, in the longitudinal direction, of the end of the strap 3. This recess 71 is delimited on one side by a concave outer wall 72 with the shape of a portion of a sphere having a radius equal to that of the spherical portion of the convex outer wall 36, and on the other side by a cylindrical pivot 73 having a radius equal to that of the spherical portion of the concave inner wall 35.

It should be noted that each half-shell 70 includes a flange 75 intended to carry the spherical pivot 73, and that after forming the connector 7 formed of the bringing close to each other of the half-shells 70, the distance separating the two flanges 75 is larger than the thickness of the strap 3, i.e. the distance separating the two flat sidewalls 33 and 34, so as to permit several degrees of freedom, namely three.

This configuration permits to form a knee-joint capable of withstanding the tensile and compression forces, while implementing a limited number of elements.

It should be noted that when the distance separating the two flanges 75 is equal to the thickness of the strap 3, a configuration is obtained that is equivalent to the one obtained with the connector 6, i.e. with one degree of freedom.

The present invention permits to design a single-piece connecting rod that has a body the tubular shape of which provides a high strength, while being made lighter, while the points of attachment its ends are provided with are located in the perfect continuity of said body, have reinforcing fibers oriented optimally, and can be configured for particular applications, in order to be subjected to tensile and/or compression forces, even when the direction of said forces is intended to vary, eventually during stress.

I claim:

1. A component system for withstanding tensile and compression forces, said component system comprising:
a composite part comprised of a plurality of reinforcing fibers and a matrix, said reinforcing fibers being embedded in said matrix, said composite part comprising:

a tubular body having a longitudinal axis, said reinforcing fibers being oriented along said longitudinal axis; and a loop portion at one end of said tubular body, said loop portion having an inner wall and an outer wall, said loop portion forming an opening perpendicular to said longitudinal axis of said tubular body; and a connecting means inserted through said opening, wherein said inner wall and said outer wall cooperatively engage said connecting means so as to determine range of motion of said composite part in response to forces on said composite part.

2. The component system, according to claim 1, wherein said reinforcing fibers pass alternately helically on from said tubular body to said loop portion.

3. The component system, according to claim 1, wherein said loop portion has two flat faces orthogonal to said longitudinal axis of said tubular body.

4. The component system, according to claim 1, wherein said connecting means is comprised of a cylindrical pivot and a recess with a cylindrical engagement surface, said cylindrical pivot inserting through said loop portion, said inner wall engaging flush to said cylindrical pivot, said outer wall engaging flush to said cylindrical engagement surface, and wherein said connecting means restricts movement of said composite part according to fixed orientation of said loop portion and the connecting means.

5. The component system, according to claim 4, said outer wall being convex, said cylindrical engagement surface having a shape complementary to said outer wall so as to be in a compression relationship to restrict movement.

6. The component system, according to claim 4, said inner wall being concave, said cylindrical pivot having a shape complementary to said inner wall so as to be in a tension relationship to restrict movement.

7. The component system, according to claim 4, wherein said inner wall and said outer wall are concentric.

8. The component system, according to claim 1, wherein said connecting means is comprised of a spherical pivot and a recess with a concave engagement surface, said spherical pivot inserting through said loop portion, said inner wall engaging flush to said spherical pivot, said outer wall engaging flush to said concave engagement surface, and wherein said connecting means restricts movement of said composite part according to fixed orientation of said loop portion and the connecting means.

9. The component system, according to claim 8, said outer wall being convex, said concave engagement surface having a shape complementary to said outer wall so as to be in a compression relationship to restrict movement.

10. The component system, according to claim 8, said inner wall being concave, said spherical pivot having a shape complementary to said inner wall so as to be in a tension relationship to restrict movement.

11. The component system, according to claim 8, wherein said inner wall and said outer wall are concentric.

* * * * *